S. F. MERRITT.
Awl-Handle.
No. 217,668.   Patented July 15, 1879.
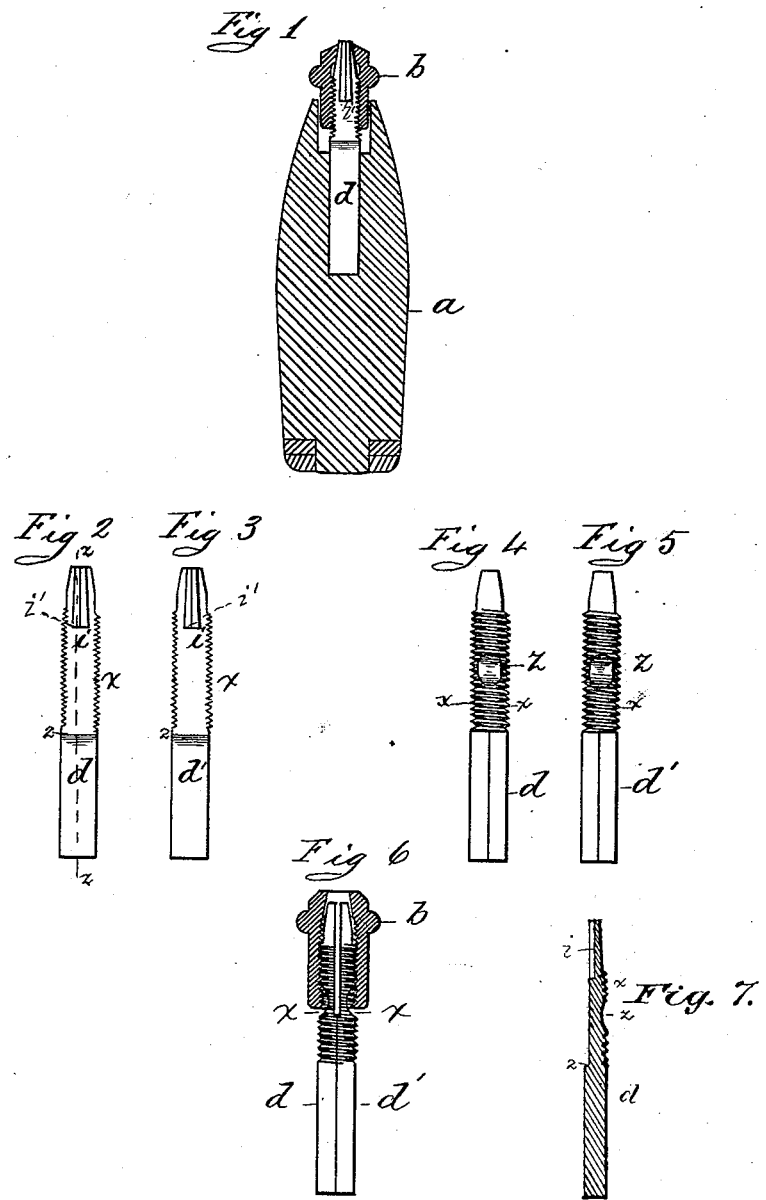

UNITED STATES PATENT OFFICE.

SAMUEL F. MERRITT, OF SPRINGFIELD, MASSACHUSETTS.

IMPROVEMENT IN AWL-HANDLES.

Specification forming part of Letters Patent No. 217,668, dated July 15, 1879; application filed December 16, 1878.

*To all whom it may concern:*

Be it known that I, SAMUEL F. MERRITT, of Springfield, county of Hampden and State of Massachusetts, have invented new and useful Improvements in the Construction of Awl-Handles, which improvements are fully set forth in the annexed specification and in the accompanying drawings.

My invention relates particularly to awl-handles used for pegging-awls; but my improvements are equally applicable to handles used with other descriptions of awls where pressure on the point of the tool tends to drive it into the handle; and has for its object great simplification in the manner of making the awl-clamping parts, whereby their cost is much reduced without impairing their efficiency; and consists of making the awl-clamp of two separate forged parts, forged in complete form for use, including the screw-thread thereon, and arranged to be held in the handle without the use of metal sockets, in proper relative position to each other for receiving and holding the shank of the awl by the awl-handle and by a clamp-nut.

Figure 1 is a vertical section of my improved awl-handle and clamping-nut, the said section showing, in elevation, one of the clamping-pieces. Figs. 2 and 3 represent the two independent clamping-pieces at their inner faces. Figs. 4 and 5 represent the outer faces of the same; Fig. 6, the two clamping portions assembled and held in place by the nut, the latter being in section. Fig. 7 is a section on the line $z\,z$ of Fig. 2.

In the drawings, $a$ is the handle. $d\,d'$ are the clamps; and $b$ is the nut to compress the clamps together, so as to hold the awl between them.

Each clamp $d\,d'$ is composed of a forged piece of metal of triangular shape at one end. The inner face of each of these forged pieces is provided with angular depressions $i$, extending from one end longitudinally along the said face, terminating in a shoulder, $i'$, which serves to receive the blunt end of the awl and act as a stop for it; and midway or near the center each of said pieces is provided with a separating-shoulder, 2, so that when the smooth flat faces of the clamps $d\,d'$ are brought together, as shown in Fig. 6, space is afforded between the acting ends of the said clamps to afford the necessary spring to permit the clamps to be brought toward each other by the nut $b$. The outer sides of these clamps are provided with a series of screw-thread-like projections, $x$, formed thereon by drop-forging, and with a sunken spot, $z$, just above the shoulder 2.

I bore a hole in the end of the handle $a$ for the reception of the lower ends of clamps $d\,d'$, which together, as in Fig. 6, form a square-ended shank. These I drive down to the bottom of said hole in handle $a$, which is of such a depth as to leave the upper tapered ends of clamps $d\,d'$ projecting a suitable distance beyond the end of the handle to allow of screwing nut $b$ thereon, and to accommodate which handle $a$ is counterbored, as shown.

The clamp-pieces $d\,d'$ are forged complete in the form shown in the drawings—that is to say, with their upper ends tapered, with the awl-shank indentations $i$ therein, with their shoulder 2, with the screw-thread on their outer surfaces, the sunken spot $z$ thereon, and with their shanks of the form of longitudinal sections of a square bar. To prepare them for nut $b$ said clamps need only to be "burred."

Nut $b$ is made in the ordinary manner, with the hole through its upper end of a suitable size and taper to draw the ends of clamps $d\,d'$ toward each other when screwed down over them.

The parts, constructed as above described, I assemble by driving clamps $d\,d'$, with nut $b$ screwed onto them, into the hole in handle $a$. The nut $b$, standing slightly above the ends of clamps $d\,d'$, allows their ends to spread far enough apart to permit of the insertion of the shank of an awl between them and in the indentations $i$ therein, the latter being of such form as to afford solid shoulders $i'$ at the bottom, to resist the thrust when pressure is brought against the point of the tool, without any tendency to separate the jaws and loosen the hold on the tool.

When the jaws are made separate the angular notches $i$ and shoulders $i'$ may be made with facility. When the jaws are in one piece the socket must be bored, is consequently round, and not adapted to gripe tools with square tangs, or to afford a good hold when the tool is to be turned under a heavy strain, like a screw-driver.

After having so placed the awl-shank, nut $b$ is screwed down, and draws the upper ends of the clamps tightly against the shank of the awl, holding it firmly therebetween.

The offset portions of the inner faces of clamps $d\ d'$, above line $x$, permit their upper ends to stand apart, as in Fig. 6, when nut $b$ is not screwed down; and the sunken parts $z$, on the outside of clamps $d\ d'$, just above shoulder 2, permit of greater flexibility of the upper ends of the clamps, without in any important degree injuring their strength.

I am aware that clamping-jaws in an awl-handle, operated to open and close upon an awl-shank by a nut screwing upon their upper ends, are not new, and I do not claim, broadly, such devices; but

What I claim as my invention is—

As an improved article of manufacture, an awl-handle composed of a handle, two forged clamping portions, $d\ d'$, each provided upon its inner face with a shouldered recess for the reception of the awl, and with a shoulder, 2, and at its outer side with screw-thread-like projections $x$, and of a threaded nut, $b$, all substantially as shown and described.

S. F. MERRITT.

In presence of—
  WM. H. CHAPIN,
  H. A. CHAPIN.